(12) United States Patent
Cao et al.

(10) Patent No.: US 10,789,443 B2
(45) Date of Patent: Sep. 29, 2020

(54) RECOGNITION DEVICE, FINGERPRINT RECOGNITION DEVICE AND FINGERPRINT RECOGNITION APPARATUS

(71) Applicant: BOE TECHNOLOGY GROUP CO., LTD., Beijing (CN)

(72) Inventors: Xueyou Cao, Beijing (CN); Haisheng Wang, Beijing (CN); Xiaoliang Ding, Beijing (CN); Chih Jen Cheng, Beijing (CN); Yanling Han, Beijing (CN); Pengpeng Wang, Beijing (CN); Wei Liu, Beijing (CN); Ping Zhang, Beijing (CN); Xue Dong, Beijing (CN); Jing Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 16/042,492

(22) Filed: Jul. 23, 2018

(65) Prior Publication Data

US 2019/0205592 A1    Jul. 4, 2019

(30) Foreign Application Priority Data

Jan. 3, 2018    (CN) .......................... 2018 1 0005120

(51) Int. Cl.
*G06K 9/00*    (2006.01)

(52) U.S. Cl.
CPC ......... *G06K 9/0002* (2013.01); *G06K 9/0004* (2013.01); *G06K 9/00053* (2013.01)

(58) Field of Classification Search
CPC ............... G06K 9/0002; G06K 9/0004; G06K 9/00053; G06K 9/00013
See application file for complete search history.

(56) References Cited

U.S. PATENT DOCUMENTS 6,327,376 B1 * 12/2001 Harkin ................... G01B 7/004
                                                              356/71
9,501,686 B2    11/2016 Lin
(Continued)

FOREIGN PATENT DOCUMENTS

| CN | 103544737 A | 1/2014 |
| CN | 105184248 A | 12/2015 |

(Continued)

OTHER PUBLICATIONS

First Chinese Office Action dated Nov. 5, 2019; Appln. No. 2018100051209.

(Continued)

*Primary Examiner* — John B Strege

(57) ABSTRACT

A recognition device, a fingerprint recognition device and a fingerprint recognition apparatus are provided, and the fingerprint recognition device includes: a detection substrate provided with fingerprint detector units; a light barrier which is provided at a side, provided with the fingerprint detector units, of the detection substrate, and provided with light through holes corresponding to the fingerprint detector units; a cover plate which is provided at a side, facing away from the detection substrate, of the light barrier, and includes a light exit surface facing the light barrier and a touch surface facing away from the light barrier; and a light source for emitting light to the cover plate. Each fingerprint detector unit is configured to output an electrical signal according to an intensity of light incident on the fingerprint detector unit, after the light passes through the light through hole corresponding to the fingerprint detector unit.

17 Claims, 2 Drawing Sheets

(56) References Cited

U.S. PATENT DOCUMENTS

| | | | |
|---|---|---|---|
| 9,811,710 B2 | 11/2017 | Gao et al. | |
| 9,829,614 B2 * | 11/2017 | Smith | G02B 27/58 |
| 10,002,242 B2 | 6/2018 | Jakobsson et al. | |
| 10,108,841 B2 * | 10/2018 | Lee | G02B 5/201 |
| 10,147,757 B2 * | 12/2018 | Lee | G06K 9/0004 |
| 10,318,787 B2 | 6/2019 | Ding et al. | |
| 10,445,545 B2 | 10/2019 | Li | |
| 2004/0234110 A1 | 11/2004 | Chou | |
| 2009/0074263 A1 * | 3/2009 | Higuchi | A61B 5/1172 |
| | | | 382/126 |
| 2012/0321149 A1 | 12/2012 | Carver et al. | |
| 2016/0070896 A1 * | 3/2016 | Higuchi | A61B 5/0077 |
| | | | 340/5.83 |
| 2019/0026523 A1 * | 1/2019 | Shen | G06K 9/0004 |
| 2019/0138154 A1 * | 5/2019 | Smith | G06F 3/0421 |

FOREIGN PATENT DOCUMENTS

| | | |
|---|---|---|
| CN | 106469303 A | 3/2017 |
| CN | 107168465 A | 9/2017 |
| TW | 201601299 A | 1/2016 |
| TW | 201712584 A | 4/2017 |
| TW | 201800978 A | 1/2018 |

OTHER PUBLICATIONS

First Taiwanese Office Action dated Sep. 27, 2019; Appln. No. 107127355.

* cited by examiner

US 10,789,443 B2

RECOGNITION DEVICE, FINGERPRINT RECOGNITION DEVICE AND FINGERPRINT RECOGNITION APPARATUS

The application claims priority to the Chinese patent application No. 201810005120.9 filed on Jan. 3, 2018, the entire disclosure of which is incorporated herein by reference as part of the present application.

TECHNICAL FIELD

Embodiments of the present disclosure relate to a recognition device, a fingerprint recognition device and a fingerprint recognition apparatus.

BACKGROUND

Fingerprint recognition technology is widely applied in many fields, and a fingerprint recognition function is integrated in more and more devices used daily, such as mobile phones and so on. A defect of present fingerprint recognition devices is that the fingerprint recognition distances of the fingerprint recognition devices are relatively short, which affects the user experience.

SUMMARY

Embodiments of the present disclosure provide a recognition device, a fingerprint recognition device and a fingerprint recognition apparatus so as to increase the Fingerprint recognition distance.

At least one embodiment of the present disclosure provides a fingerprint recognition device, and the fingerprint recognition device includes a detection substrate provided with a plurality of fingerprint detector units; and the fingerprint recognition device further includes a light barrier, a cover plate and a light source; the light barrier is at a side, provided with the fingerprint detector units, of the detection substrate, and a plurality of light through holes which correspond to the fingerprint detector units are in the light barrier; the cover plate is at a side, facing away from the detection substrate, of the light barrier, and the cover plate includes a light exit surface facing the light barrier and a touch surface facing away from the light barrier; and the light source is configured to emit light to the cover plate, and at least a part of the light from the light source is reflected to at least a part of the light through holes by a fingerprint on the touch surface of the cover plate; each fingerprint detector unit is configured to output an electrical signal according to an intensity of light incident on the fingerprint detector unit after the light incident on the fingerprint detector unit passes through the light through holes which corresponds to the fingerprint detector unit.

For example, the light source is at the side, facing away from the detection substrate, of the light barrier.

For example, the cover plate further includes a light entry surface which connects the light exit surface and the touch surface, and the light source is opposite to the light entry surface of the cover plate.

For example, a refractive index of the cover plate is greater than a refractive index of a medium which is in contact with the cover plate.

For example, a refractive index of the cover plate is greater than a refractive index of air and less than a refractive index of the fingerprint.

For example, the light source and the cover plate are configured that: after the light from the light source enters the cover plate via the light entry surface, in a situation where the light from the light source is incident on a position, where no touch occurs, of the touch surface, the light from the light source is totally reflected, and in a situation where the light from the light source is incident on a position, where touch occurs, of the touch surface, the light from the light source is reflected by the fingerprint on the touch surface and then passes through the light exit surface.

For example, a distance between the touch surface of the cover plate and the light barrier is greater than a distance between the fingerprint detector units and the light barrier.

For example, the detection substrate is provided with a temperature detector unit, and the temperature detector unit is configured to output a corresponding electrical signal according to a temperature of a region where the temperature detector unit is located.

For example, the temperature detector unit is configured to output a voltage signal oscillating between a high level and a low level, and an oscillation frequency of the voltage signal is associated with the temperature of the region where the temperature detector unit is located.

For example, the temperature detector unit includes a plurality of stages of inverters, and a number of the stages of the inverters is an odd number; an input of a first stage inverter is connected to an output of a last stage inverter; from a second stage inverter to the last stage inverter, an input of each stage inverter is connected to an output of a previous stage inverter, and the output of the last stage inverter serves as an output of the temperature detector unit; intervals are between adjacent ones of the fingerprint detector units, and each stage inverter is in one of the intervals between the adjacent ones of the fingerprint detector units.

For example, each of the inverters includes a first N-type transistor and a second N-type transistor; both a gate electrode of the first N-type transistor and a first electrode of the first N-type transistor are connected to a high-level input, and a second electrode of the first N-type transistor is connected to an output of the inverter; and a gate electrode of the second N-type transistor is connected to an input of the inverter, a first electrode of the second N-type transistor is connected to the output of the inverter, and a second electrode of the second N-type transistor is connected to a low-level input.

For example, the plurality of fingerprint detector units forms a plurality of rows and a plurality of columns, the detection substrate is further provided with a plurality of scanning lines and a plurality of signal reading lines, each of the scanning lines corresponds to one row of the fingerprint detector units, and each of the signal reading lines corresponds to one column of the fingerprint detector units.

For example, each the fingerprint detector unit includes a photosensitive diode and a switch transistor, a gate electrode of the switch transistor is connected to the scanning line corresponding to the fingerprint detector unit, a first electrode of the switch transistor is connected to the signal reading line corresponding to the fingerprint detector unit, a second electrode of the switch transistor is connected to a first electrode of the photosensitive diode, and a second electrode of the photosensitive diode is connected to a predetermined voltage terminal.

At least one embodiment of the present disclosure further provides a fingerprint recognition apparatus, and the fingerprint recognition apparatus includes a fingerprint recognition circuit and any one of the above-mentioned fingerprint recognition devices, and the fingerprint recognition circuit is connected to an output of each fingerprint detector unit, and the fingerprint recognition circuit is configured to acquire an image of the fingerprint on the touch surface of the cover plate according to the electrical signal outputted by the fingerprint detector unit.

For example, the fingerprint recognition device includes a temperature detector unit, and the fingerprint recognition apparatus further includes a temperature detection circuit, the temperature detection circuit is connected to an output of the temperature detector unit, and the temperature detection circuit is configured to calculate a corresponding temperature according to an electrical signal outputted by the temperature detector unit.

For example, the temperature detection circuit comprises a voltage comparator, a voltage regulator and a calculator unit; a first input of the voltage comparator is connected to the output of the temperature detector unit, a second input of the voltage comparator is connected to a reference voltage terminal, and the voltage comparator is configured to output a high-level signal in a case where a signal voltage of the first input is greater than a signal voltage of the second input and to output a low-level signal in a case where the signal voltage of the first input is not greater than the signal voltage of the second input; the voltage regulator is connected to an output of the voltage comparator, the voltage regulator is configured to output the low-level signal in a case where the voltage comparator outputs the low-level signal, and the voltage regulator is configured to regulate a voltage of the high-level signal to a maximum recognition voltage of the calculator unit and output a signal after regulation in a case where the voltage comparator outputs the high-level signal; and the calculator unit is connected to the voltage regulator, and the calculator unit is configured to calculate a corresponding temperature according to a frequency of a signal received by the calculator unit.

At least one embodiment of the present disclosure further provides a recognition device, and the recognition device includes a detection substrate, a light barrier, a cover plate and a light source. The detection substrate includes a plurality of detector units; the light barrier is at a side, provided with the detector units, of the detection substrate, and a plurality of light through holes corresponding to the detector units are in the light barrier; the cover plate is at a side, facing away from the detection substrate, of the light barrier, and the cover plate includes a light exit surface facing the light barrier and a touch surface facing away from the light barrier, and a refractive index of the cover plate is greater than a refractive index of a medium which is outside the cover plate and is in contact with the cover plate; the light source configured to emit light to the cover plate; each detector unit is configured to detect an intensity of light, which exits from the light exit surface of the cover plate, passes through one of the light through holes corresponding to the detector unit and is incident on the detector unit, and to output an electrical signal corresponding to the intensity of the light.

For example, a distance between the touch surface of the cover plate and a surface, facing the cover plate, of the light barrier is greater than a distance between a plane where light irradiation surfaces of the plurality of detector units are located and a surface, facing the detection substrate, of the light barrier.

For example, the detection substrate is further provided with a temperature detector unit, and the temperature detector unit is configured to output a corresponding electrical signal according to a temperature of a region where the temperature detector unit is located.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Figure 1:
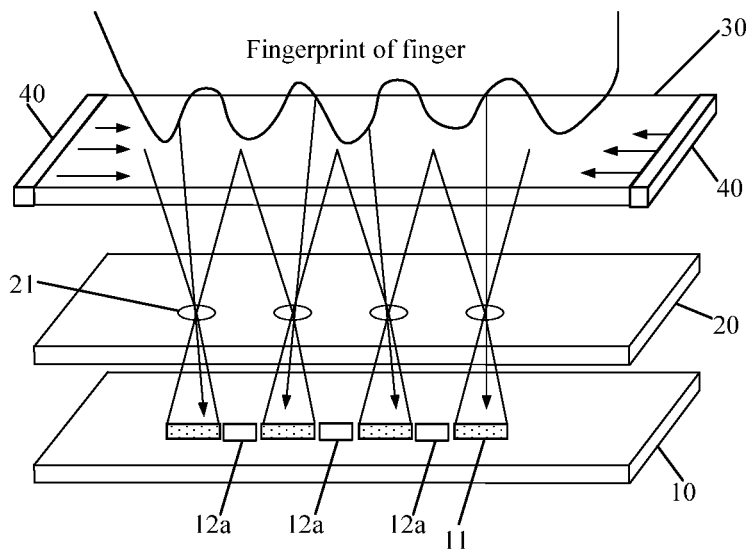
FIG. 1 is a schematic diagram of a stereoscopic structure of a fingerprint recognition device provided by at least one embodiment of the present disclosure.

At least one embodiment of the present disclosure provides a fingerprint recognition device, as illustrated in FIG. 1, the fingerprint recognition device includes a detection substrate 10, a light barrier 20, a cover plate 30 and a light source 40 (for example, two or more light sources 40).

The detection substrate 10 is provided with a plurality of fingerprint detector units 11 which are spaced apart from each other.

The light barrier 20 is at a side, provided with the fingerprint detector units 11, of the detection substrate 10, and a plurality of light through holes 21 which correspond to the fingerprint detector units 11 are in the light barrier 20. In this way, orthographic projections of the light through holes 21 on the detection substrate 10 are within a region surrounded by the outermost fingerprint detector units 11.

The cover plate 30 is at a side, facing away from the detection substrate 10, of the light barrier 20, and the cover plate includes a light exit surface facing the light barrier 20 and a touch surface facing away from the light barrier 20.

The light source 40 is configured to emit light to the cover plate 30, and at least a part of the light from the light source 40 is reflected to at least a part of the light through holes 21 by a fingerprint on the touch surface of the cover plate 30. For example, the light source 40 is at the side, facing away from the detection substrate 10, of the light barrier 20; or, in other embodiments, the light source 40 is at a side, close to the detection substrate 10, of the light barrier 20 and emits light to the cover plate 30 via a light-guiding element (for example, an optical fiber). For example, light emitted by the light source 40 can be modulated light or non-modulated light.

Each fingerprint detector unit 11 is configured to output an electrical signal according to an intensity of light which is emitted by the light source 40 and is incident on the fingerprint detector unit 11 after exiting from the light exit surface of the cover plate 30 and passing through one of the light through holes 21, which one corresponds to the fingerprint detector unit.

The fingerprint recognition device provided by at least one embodiment of the present disclosure utilizes the principle of pinhole imaging; in a case where touch occurs, a part of the light from the light source 40 is reflected to at least a part of the light through holes 21 by a fingerprint, and then is received by at least a part of the fingerprint detector units 11; because the light reflected by a valley of the fingerprint and the light reflected by a ridge of the fingerprint are in different reflection degrees, electrical signals generated by the fingerprint detector units 11 according to the light reflected by the valley and the light reflected by the ridge respectively are different, and thus a fingerprint image can be recognized according to the electrical signals outputted by the fingerprint detector units 11.

In a present fingerprint recognition device, whether a capacitive fingerprint recognition device, an optical fingerprint recognition device or an ultrasonic fingerprint recognition device, a detection distance of the fingerprint recognition device is relatively short, which results in that in a case where the fingerprint recognition device is integrated in an electronic product, user experience of the product is affected. For example, in a mobile phone, limited by the detection distance, a certain dent is formed in the back of the mobile phone, which affects an overall beauty and user experience of the mobile phone. In at least one embodiment of the present disclosure, a method of detecting light is used to achieve the fingerprint recognition, and the light reflected by the fingerprint is affected by utilizing the principle of pinhole imaging, which enables light reflected by a distant fingerprint can also be received by the fingerprint detector units 11, thus the detection distance of the fingerprint detection device can be increased, so the fingerprint recognition device can be integrated in a mobile phone better, the beauty of the product integrated with the fingerprint detection device is improved and user experience of the product is improved.

For example, the number of the fingerprint detector units 11 is equal to the number of the light through holes 21, and in this case, the fingerprint detector units 11 correspond to the light through holes 21 in a one-to-one manner.

For example, the number of the fingerprint detector units 11 is more than the number of the light through holes 21. In this case, each light through hole 21 corresponds to multiple fingerprint detector units 11, which is advantageous for reducing crosstalk. In the embodiment of the present disclosure, the light which is emitted from the light through hole 21 and falls on the detection substrate 10 forms a light spot and the light spot covers two or more fingerprint detector units 11. For example, the light spots formed on the detection substrate 10 by light emitted from different light through holes 21 do not overlap, so that the single fingerprint detector unit 11 is covered by only one light spot, which is advantageous for further reducing crosstalk. For example, the fingerprint detector units 11 covered by the same light spot are arranged in rows and columns. For example, the number of fingerprint detector units 11 in each row and the number of fingerprint detector units 11 in each column are smaller than or equal to 10, which is advantageous for obtaining a better fingerprint recognition effect.

For example, the shape of the opening of the light through hole 21 may be a circle, a polygon, a quasi-polygon, or the like, which is not limited in the embodiments of the disclosure. For example, the width of the opening of each light through hole 21 is 5-50 µm, which is advantageous for the achievement of pinhole imaging. The width of the opening of the light through hole 21 is not too large or too small, so as to avoid the failure of pinhole imaging.

For example, the plurality of fingerprint detector units 11 on the detection substrate 10 are arranged in an array, and similarly, the light through holes 21 on the light barrier 20 are also arranged in an array.

For example, the cover plate 30 is a light guide plate. For example, the cover plate 30 further includes a light entry surface which connects the light exit surface and the touch surface, and the light source 40 is opposite to the light entry surface of the cover plate 30; a refractive index of the cover plate 30 is greater than a refractive index of a medium (for example, air) which is in contact with the cover plate 30 and less than a refractive index of the fingerprint. And the light source 40 and the cover plate 30 are configured that: after the light from the light source 40 enters the cover plate 30 via the light entry surface, the light from the light source is totally reflected within the cover plate 30 in a situation that the light from the light source is incident on a position, where no touch occurs, of the touch surface, and the light from the light source is reflected by the fingerprint on the touch surface and then passes through the light exit surface in a situation that the light from the light source is incident on a position, where touch occurs, of the touch surface, that is, a finger having the fingerprint destroys the condition of total reflection, which makes the light incident to the finger be reflected and then exit from the cover plate 21.

It is considered that in a case where a distance between the fingerprint and each light through hole 21 is less than a distance between the light through hole 21 and the fingerprint detector unit 11 corresponding to the light through hole 21, light reflected on different fingerprint detector units 11 is easy to produce interference, and thereby an accuracy of fingerprint recognition is affected; for example, in order to eliminate the interference of light, the number of the fingerprint detector units 11 can be increased, thus difficulty of a production process is increased. In order to ensure the accuracy of fingerprint recognition, and at the same time, ensure that the difficulty of the production process is not increased, for example, a distance between the touch surface of the cover plate 30 and the light barrier 20 is greater than a distance between the fingerprint detector units 11 and the light barrier 20, that is, a distance between the touch surface of the cover plate 30 and an upper surface (that is a surface facing the cover plate 30) of the light barrier 20 is greater than a distance between a plane where light irradiation surfaces of the plurality of fingerprint detector units are located and the upper surface (that is a surface facing the detection substrate 10) of the light barrier 20.

Figure 2:
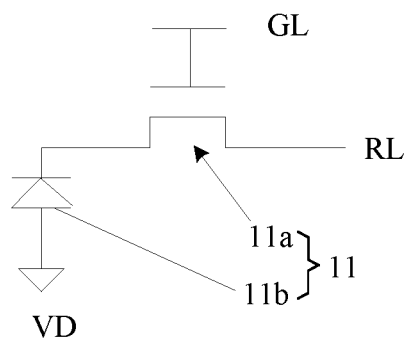
FIG. 2 is a circuit diagram of a fingerprint detector unit in at least one embodiment of the present disclosure.
Figure 3:
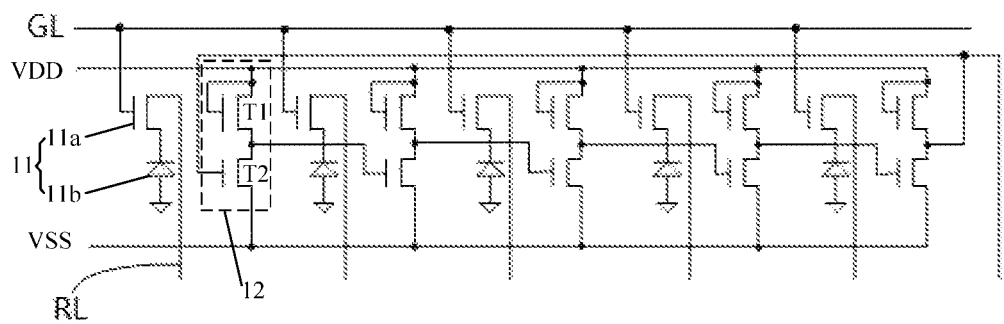
FIG. 3 is a circuit diagram of fingerprint detector units and temperature detector units in at least one embodiment of the present disclosure.

For example, the plurality of fingerprint detector units 11 on the detection substrate 10 forms a plurality of rows and a plurality of columns; as illustrated in FIG. 2 and FIG. 3, the detection substrate 10 is further provided with a plurality of scanning lines GL and a plurality of signal reading lines RL, each of the scanning lines GL corresponds to one row of the fingerprint detector units 11, and each of the signal reading lines RL corresponds to one column of the fingerprint detector units 11. Each fingerprint detector unit includes a photosensitive diode 11b and a switch transistor 11a; a gate electrode of the switch transistor 11a is connected to the scanning line GL corresponding to the row, where the switch transistor 11a is located, of the fingerprint detector units; a first electrode of the switch transistor 11a is connected to the signal reading line RL corresponding to the column, where the switch transistor 11a is located, of the fingerprint detector units; a second electrode of the switch transistor 11a is connected to a first electrode of the photosensitive diode 11b; and a second electrode of the photosensitive diode 11b is connected to a predetermined voltage terminal VD. For example, the first electrode of the photosensitive diode 11b is a negative electrode, the second electrode of the photosensitive diode 11b is a positive electrode, and the predetermined voltage terminal VD is a negative voltage signal terminal, so as to make the photosensitive diode 11b in a state of reverse bias.

Under irradiation of light, the photosensitive diode 11b produces a current corresponding to an intensity of the light; in the fingerprint recognition, a scanning signal is supplied to the scanning lines GL line by line, which enables the switch transistors 11a to be turned on line by line; at the same time, a current of each of the plurality of signal reading lines RL is detected respectively, thus an intensity of light received by each fingerprint detector unit 11 is determined according to the current of each switch transistor 11a, and then a fingerprint image is determined.

For example, as illustrated in FIG. 1, the detection substrate 10 is further provided with a temperature detector unit 12, and the temperature detector unit 12 is configured to output a corresponding electrical signal according to a temperature of a region where the temperature detector unit 12 is located, and then the temperature of the region provided with the temperature detector unit 12 can be determined by the electrical signal outputted by the temperature detector unit 12. In this way, the fingerprint recognition device not only can be used for fingerprint recognition, but also can be used for a detection of ambient temperature or finger temperature, so that the fingerprint recognition device can be applied to more occasions.

For example, the electrical signal outputted by the temperature detector unit 12 is a voltage signal oscillating between a high level and a low level, and an oscillation frequency of the voltage signal is associated with the temperature of the region where the temperature detector unit 12 is located. Combining that illustrated in FIG. 1, FIG. 3 and FIG. 4, for example, the temperature detector unit 12 includes a plurality of stages of inverters 12a, and the number of the stages of the inverters is an odd number; an input Vin of a first stage inverter 12a is connected to an output Vout of a last stage inverter 12a; from a second stage inverter to the last stage inverter, an input of each stage inverter 12a is connected to an output of a previous stage inverter 12a, and the output Vout of the last stage inverter 12a serves as an output of the temperature detector unit 12 so as to output the voltage signal oscillating between the high level and the low level.

Figure 4:
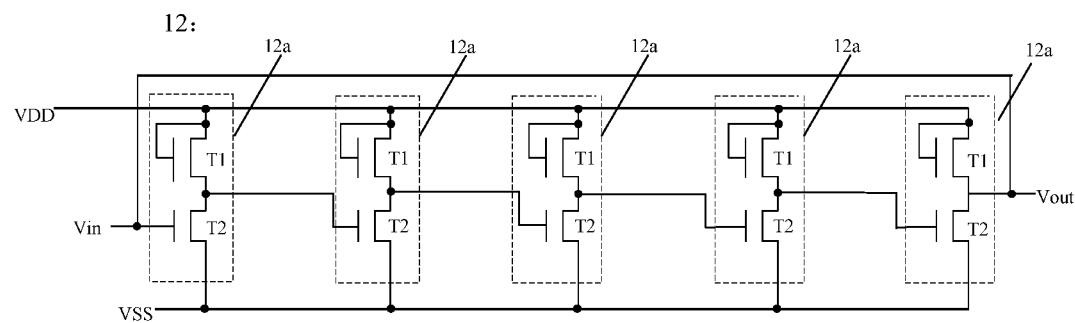
FIG. 4 is a circuit diagram of temperature detector units in at least one embodiment of the present disclosure.

For example, the plurality of stages of inverters 12a are arranged along a direction of the row or along a direction of the column, and the ordinal number of the stage of each inverter 12a is the ordinal number of an arrangement order along the arrangement direction of the inverters 12a. In FIG. 3 and FIG. 4, it is taken as an example that the temperature detector unit 12 includes five stages of inverters, and in other embodiments, the number of the stages of inverters 12a can be other values.

For example, as illustrated in FIG. 3 and FIG. 4, each of the inverters 12a includes a first N-type transistor T1 and a second N-type transistor T2. Both a gate electrode of the first N-type transistor T1 and a first electrode of the first N-type transistor T1 are connected to a high-level input VDD, and a second electrode of the first N-type transistor T1 is connected to an output of the inverter 12a. A gate electrode of the second N-type transistor T2 is connected to an input of the inverter 11a, a first electrode of the second N-type transistor T2 is connected to the output of the inverter 12a, and a second electrode of the second N-type T2 transistor is connected to a low-level input VSS.

In a case where the input of the inverter 12a receives a high-level signal, the second N-type transistor T2 is turned on, which thus enables the output of the inverter 12a to output a low-level signal; in a case where the input of the inverter 12a receives a low-level signal, the second N-type transistor T2 is turned off, and the output of the inverter 12a outputs a high-level signal. When the temperature changes, a leakage current of the second N-type transistor T2 changes; the higher the temperature, the greater the leakage current; in a case where a voltage of the first electrode of the second N-type transistor T2 is reduced to a threshold voltage of a second N-type transistor T2 of a next stage inverter 12a, the second N-type transistor T2 of the next stage inverter 12a is turned off, which enables the next stage inverter 12a output a high-level signal; and the like, the last stage inverter 12a outputs a low-level signal, and the low-level signal is inputted into the input of the first stage inverter 12a, which enables the last stage inverter 12a outputs a high-level signal, and thus enables the temperature detector unit 12 outputs an oscillating signal with the oscillation frequency corresponding to the temperature. And the higher the temperature, the greater the leakage current, the larger the oscillation frequency of the voltage signal, thus the temperature can be determined according to the oscillation frequency.

For example, in order to prevent the temperature detector unit 12 from being interfered by the light, the detection substrate 10 can be further provided with a light-shielding layer shielding both the first N-type transistor T1 and the second the N-type transistor T2.

As mentioned above, the distance between the touch surface of the cover plate 30 and the light barrier 20 is greater than the distance between the fingerprint detector units 11 and the light barrier 20, which can further enables that certain intervals respectively exist between adjacent ones of the fingerprint detector units 11, and in this case, each stage inverter can be arranged in one of the intervals between the adjacent ones of the fingerprint detector units 11, as illustrated in FIG. 1 and FIG. 4, and thus a size of the detection substrate needs no expansion; in addition, in a process of manufacturing the fingerprint recognition device, transistors of the inverters 12a and the switch transistors 11a of the fingerprint detector units 11 can be manufactured at a same time, and thus a function of fingerprint recognition and a function of temperature detection can be achieved at the same time without increasing the difficulty of the process.

For example, the detection substrate 10 can be provided with one temperature detector unit 12, or can be provided with a plurality of temperature detector units 12. For example, the plurality of stages of inverters 12a in each temperature detector unit 12 can be arranged along the row direction of the plurality of fingerprint detector units 11, or can be arranged along the column direction of the plurality of fingerprint detector units 11. For example, intervals between adjacent ones of the fingerprint detector units 11 can be provided with only one temperature detector unit 12.

Figure 5:
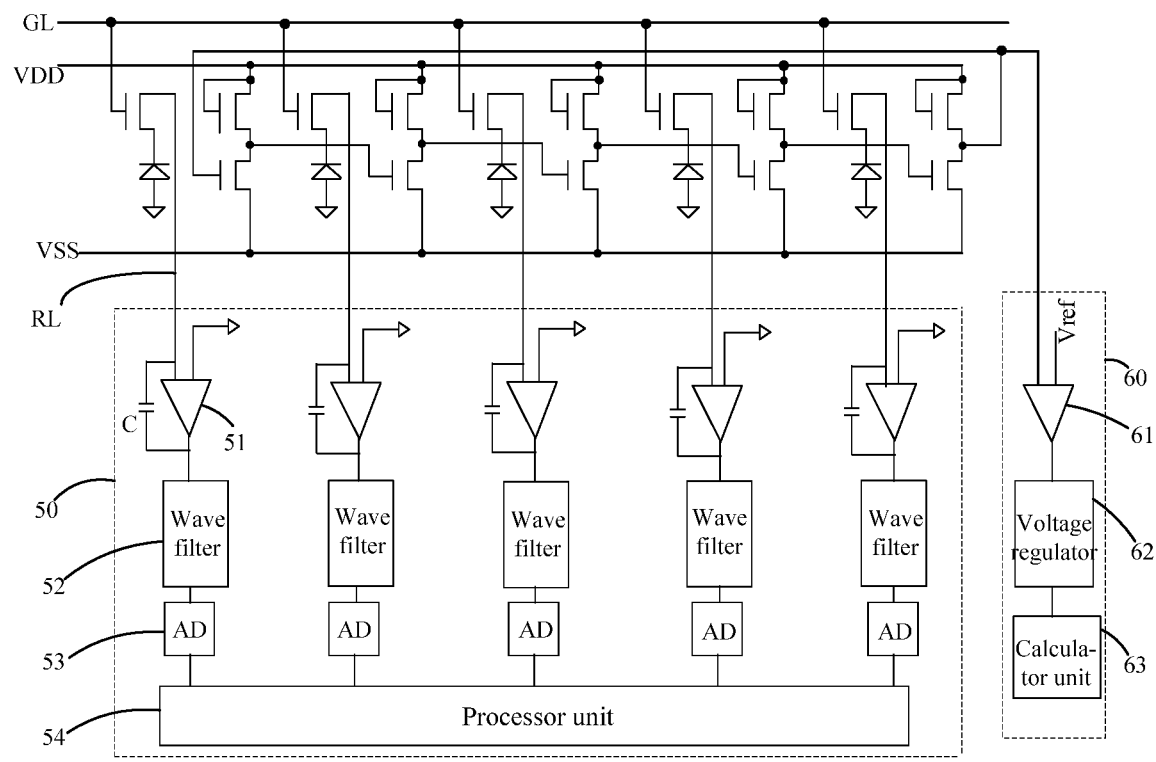
FIG. 5 is a schematic diagram of a circuit of a fingerprint recognition apparatus in at least one embodiment of the present disclosure.

According to a second aspect, at least one embodiment of the present disclosure further provides a fingerprint recognition apparatus, as illustrated in FIG. 5, the fingerprint recognition apparatus includes a fingerprint recognition circuit 50 and the fingerprint recognition device mentioned above, the fingerprint recognition circuit 50 is connected to an output of each fingerprint detector unit 11, and the fingerprint recognition circuit 50 is configured to acquire an image of the fingerprint on the touch surface of the cover plate 30 according to the electrical signals outputted by the fingerprint detector units 11.

For example, the fingerprint recognition apparatus can be a mobile phone, a computer, a navigator or a digital camera, or the like.

For example, as illustrated in FIG. 5, the fingerprint recognition circuit 50 is connected to the signal reading lines RL, and for example, the fingerprint recognition circuit 50 includes: integrated amplifiers which correspond to and are connected to the signal reading lines RL in a one-to-one manner, wave filters 52 which correspond to and are connected to the integrated amplifiers in a one-to-one manner, analog-digital converters 53 which correspond to and are connected to the wave filters 52 and a processor unit 54 which is connected to each of the analog-digital converters 53. Each integrated amplifier includes a capacitor C and an operational amplifier 51 (for example, each integrated amplifier consists of the capacitor C and the operational amplifier 51), and each integrated amplifier is configured to amplify a current read from the signal reading line RL corresponding to the integrated amplifier; each wave filter 52 is configured to filter a signal outputted by the integrated amplifier corresponding to the wave filter 52; each analog-digital converter 53 is configured to achieve an analog-digital conversion of a signal outputted by the wave filter 52 corresponding to the analog-digital converter 53; the processor unit 54 is configured to calculate an intensity of the light received by each of the fingerprint detector units 11 corresponding to the processor unit 54, according to a digital signal outputted by each of the analog-digital converters 53, thus an image of a fingerprint is recognized.

As mentioned above, for example, the fingerprint recognition device further includes a temperature detector unit 12, in this case, for example, the fingerprint recognition apparatus further includes a temperature detection circuit 60, the temperature detection circuit 60 is connected to an output of the temperature detector unit 12, and the temperature detection circuit 60 is configured to calculate a corresponding temperature according to an electrical signal output by the temperature detector unit 12.

For example, as mentioned above, the temperature detector unit 12 includes a plurality of stages of inverters, thus the temperature detector unit 12 outputs a voltage signal oscillating between a high level and a low level, in this case, the temperature detection circuit 60 includes a voltage comparator 61, a voltage regulator 62 and a calculator unit 63. A first input of the voltage comparator 61 is connected to the output of the temperature detector unit 12, a second input of the voltage comparator 61 is connected to a reference voltage terminal Vref, and the voltage comparator 61 is configured to output a high-level signal a case where a signal voltage of the first input is greater than a signal voltage of the second input and to output a low-level signal in a case where the signal voltage of the first input is not greater than the signal voltage of the second input. The voltage comparator 61 is configured to convert an oscillating voltage signal outputted by the temperature detector unit into a regular square wave signal. The voltage regulator 62 is connected to an output of the voltage comparator 61, the voltage regulator 62 is configured to output the low-level signal in a case where the voltage comparator 61 outputs the low-level signal, and the voltage regulator 62 is configured to regulate a voltage of the high-level signal to a maximum recognition voltage of the calculator unit 63 and to output a signal after regulation in a case where the voltage comparator 61 outputs the high-level signal, so as to prevent the signal supplied to the calculator unit 63 from exceeding the recognition range of the calculator unit 63. The calculator unit 63 is connected to the voltage regulator 62, and the calculator unit 63 is configured to calculate a corresponding temperature according to a frequency of a signal received by the calculator unit 63.

For example, the calculator unit 63 can be a field programmable gate array (FPGA), a central processor unit (CPU), a micro controller unit (MCU), a digital signal processing (DSP), or a programmable logic controller (PLC) or processor of other types.

At least one embodiment of the present disclosure further provides a recognition device, and the recognition device includes a detection substrate, a light barrier, a cover plate and a light source. The detection substrate includes a plurality of detector units; the light barrier is at a side, provided with the detector units, of the detection substrate, and a plurality of light through holes corresponding to the detector units are in the light barrier; the cover plate is at a side, facing away from the detection substrate, of the light barrier, the cover plate includes a light exit surface facing the light barrier and a touch surface facing away from the light barrier, and a refractive index of the cover plate is greater than a refractive index of a medium which is outside the cover plate and is in contact with the cover plate; the light source configured to emit light to the cover plate; each detector unit is configured to detect an intensity of light, which exits from the light exit surface of the cover plate, passes through the light through hole corresponding to the detector unit and is incident on the detector unit, and to output an electrical signal corresponding to the intensity of the light.

For example, the light-emitting surface and the touch surface of the cover plate are in contact with the same medium; or, the light-emitting surface and the touch surface of the cover plate are in contact with different kinds of media, in which case, the refractive index of the cover plate is larger than the refractive index of the different kinds of media.

For example, the recognition device can be a fingerprint recognition device or a touch recognition device or a recognition device of other types.

For example, a distance between the touch surface of the cover plate and a surface, facing the cover plate, of the light barrier is greater than a distance between a plane where light irradiation surfaces of the plurality of detector units are located and a surface, facing the detection substrate, of the light barrier.

For example, the detection substrate is further provided with a temperature detector unit, and the temperature detector unit is configured to output a corresponding electrical signal according to a temperature of a region where the temperature detector unit is located.

The arrangements of the detection substrate, the light barrier, the cover plate, the light source and the temperature detector unit can be referred to the description of the above-mentioned embodiments about the fingerprint recognition device and the fingerprint recognition apparatus, and repeated descriptions are omitted herein.

What is mentioned above is the descriptions of the recognition device, the fingerprint recognition device and the fingerprint recognition apparatus provided by the embodiments of the present disclosure, and it can be seen that the fingerprint recognition device provided by at least one embodiment of the present disclosure detects a fingerprint by utilizing the principle of pinhole imaging, which can increase the detection distance and then improve the beauty and user experience of the fingerprint recognition device; and the fingerprint recognition device not only can be used for fingerprint recognition, but also can be used for a detection of temperature, so that the fingerprint recognition device can be applied to more occasions.

What are described above is related to the illustrative embodiments of the disclosure only and not limitative to the scope of the disclosure; the scopes of the disclosure are defined by the accompanying claims.

What is claimed is:

1. A fingerprint recognition device, comprising:
a detection substrate, provided with a plurality of fingerprint detector units;
a light barrier at a side, provided with the fingerprint detector units, of the detection substrate, wherein a plurality of light through holes which correspond to the fingerprint detector units are in the light barrier;
a cover plate at a side, facing away from the detection substrate, of the light barrier, wherein the cover plate comprises a light exit surface facing the light barrier and a touch surface facing away from the light barrier; and
a light source configured to emit light to the cover plate, wherein at least a part of the light from the light source is reflected to at least a part of the light through holes by a fingerprint on the touch surface of the cover plate,
wherein each fingerprint detector unit is configured to output an electrical signal according to an intensity of light incident on the fingerprint detector unit, after the light incident on the fingerprint detector unit passes through the light through hole which corresponds to the fingerprint detector unit;
the cover plate further comprises a light entry surface which connects the light exit surface and the touch surface, and the light source is opposite to the light entry surface of the cover plate;
wherein a refractive index of the cover plate is greater than a refractive index of air and less than a refractive index of the fingerprint.

2. The fingerprint recognition device according to claim 1, wherein a distance between the touch surface of the cover plate and the light barrier is greater than a distance between the fingerprint detector units and the light barrier.

3. The fingerprint recognition device according to claim 1, wherein the plurality of fingerprint detector units forms a plurality of rows and a plurality of columns, the detection substrate is further provided with a plurality of scanning lines and a plurality of signal reading lines, each of the scanning lines corresponds to one row of the fingerprint detector units, and each of the signal reading lines corresponds to one column of the fingerprint detector units.

4. The fingerprint recognition device according to claim 3, wherein each the fingerprint detector unit comprises a photosensitive diode and a switch transistor, a gate electrode of the switch transistor is connected to the scanning line corresponding to the fingerprint detector unit, a first electrode of the switch transistor is connected to the signal reading line corresponding to the fingerprint detector unit, a second electrode of the switch transistor is connected to a first electrode of the photosensitive diode, and a second electrode of the photosensitive diode is connected to a predetermined voltage terminal.

5. A fingerprint recognition apparatus, comprising the fingerprint recognition device according to claim 1 and a fingerprint recognition circuit, wherein the fingerprint recognition circuit is connected to an output of each fingerprint detector unit, and the fingerprint recognition circuit is configured to acquire an image of the fingerprint on the touch surface of the cover plate according to electrical signals outputted by the fingerprint detector units.

6. The fingerprint recognition apparatus according to claim 5, wherein the fingerprint recognition device comprises a temperature detector unit, the fingerprint recognition apparatus further comprises a temperature detection circuit, the temperature detection circuit is connected to an output of the temperature detector unit, and the temperature detection circuit is configured to calculate a corresponding temperature according to an electrical signal outputted by the temperature detector unit.

7. The fingerprint recognition apparatus according to claim 6, wherein
the temperature detector unit comprises a plurality of stages of inverters, and a number of the stages of the inverters is an odd number;
an input of a first stage inverter is connected to an output of a last stage inverter;
from a second stage inverter to the last stage inverter, an input of each stage inverter is connected to an output of a previous stage inverter, and the output of the last stage inverter serves as an output of the temperature detector unit; and
intervals are between adjacent ones of the fingerprint detector units, and each stage inverter is in one of the intervals between the adjacent ones of the fingerprint detector units.

8. The fingerprint recognition apparatus according to claim 7, wherein the temperature detection circuit comprises a voltage comparator, a voltage regulator and a calculator unit;
a first input of the voltage comparator is connected to the output of the temperature detector unit, a second input of the voltage comparator is connected to a reference voltage terminal, and the voltage comparator is configured to output a high-level signal in a case where a signal voltage of the first input is greater than a signal voltage of the second input and to output a low-level signal in a case where the signal voltage of the first input is not greater than the signal voltage of the second input;
the voltage regulator is connected to an output of the voltage comparator, the voltage regulator is configured to output the low-level signal in a case where the voltage comparator outputs the low-level signal, and the voltage regulator is configured to regulate a voltage of the high-level signal to a maximum recognition voltage of the calculator unit and output a signal after regulation in a case where the voltage comparator outputs the high-level signal; and
the calculator unit is connected to the voltage regulator, and the calculator unit is configured to calculate a corresponding temperature according to a frequency of a signal received by the calculator unit.

9. The fingerprint recognition device according to claim 1, wherein the light source is at the side, facing away from the detection substrate, of the light barrier.

10. The fingerprint recognition device according to claim 1, wherein a refractive index of the cover plate is greater than a refractive index of a medium which is in contact with the cover plate.

11. The fingerprint recognition device according to claim 10, wherein the light source and the cover plate are configured that: after the light from the light source enters the cover plate via the light entry surface, the light from the light source is totally reflected within the cover plate in a situation where the light from the light source is incident on a position, where no touch occurs, of the touch surface, and the light from the light source is reflected by the fingerprint on the touch surface and then passes through the light exit surface in a situation where the light from the light source is incident on a position, where touch occurs, of the touch surface.

12. A fingerprint recognition device, comprising:
a detection substrate, provided with a plurality of fingerprint detector units;
a light barrier at a side, provided with the fingerprint detector units, of the detection substrate, wherein a plurality of light through holes which correspond to the fingerprint detector units are in the light barrier;
a cover plate at a side, facing away from the detection substrate, of the light barrier, wherein the cover plate comprises a light exit surface facing the light barrier and a touch surface facing away from the light barrier; and
a light source configured to emit light to the cover plate, wherein at least a part of the light from the light source is reflected to at least a part of the light through holes by a fingerprint on the touch surface of the cover plate,
wherein each fingerprint detector unit is configured to output an electrical signal according to an intensity of light incident on the fingerprint detector unit, after the light incident on the fingerprint detector unit passes through the light through hole which corresponds to the fingerprint detector unit;
the detection substrate is provided with a temperature detector unit, and the temperature detector unit is configured to output a corresponding electrical signal according to a temperature of a region where the temperature detector unit is located;
the temperature detector unit is configured to output a voltage signal oscillating between a high level and a low level, and an oscillation frequency of the voltage signal is associated with the temperature of the region where the temperature detector unit is located.

13. The fingerprint recognition device according to claim 12, wherein
the temperature detector unit comprises a plurality of stages of inverters, and a number of the stages of the inverters is an odd number;
an input of a first stage inverter is connected to an output of a last stage inverter;
from a second stage inverter to the last stage inverter, an input of each stage inverter is connected to an output of a previous stage inverter, and the output of the last stage inverter serves as an output of the temperature detector unit; and
intervals are between adjacent ones of the fingerprint detector units, and each stage inverter is in one of the intervals between the adjacent ones of the fingerprint detector units.

14. The fingerprint recognition device according to claim 13, wherein each of the inverters comprises a first N-type transistor and a second N-type transistor,
both a gate electrode of the first N-type transistor and a first electrode of the first N-type transistor are connected to a high-level input, and a second electrode of the first N-type transistor is connected to an output of the inverter; and
a gate electrode of the second N-type transistor is connected to an input of the inverter, a first electrode of the second N-type transistor is connected to the output of the inverter, and a second electrode of the second N-type transistor is connected to a low-level input.

15. A recognition device, comprising:
a detection substrate which comprises a plurality of detector units;
a light barrier at a side, provided with the detector units, of the detection substrate, wherein a plurality of light through holes corresponding to the detector units are in the light barrier;
a cover plate at a side, facing away from the detection substrate, of the light barrier, wherein the cover plate comprises a light exit surface facing the light barrier and a touch surface facing away from the light barrier, and a refractive index of the cover plate is greater than a refractive index of a medium which is outside the cover plate and is in contact with the cover plate; and
a light source configured to emit light to the cover plate,
wherein each detector unit is configured to detect an intensity of light, which exits from the light exit surface of the cover plate, passes through the light through hole corresponding to the detector unit and is incident on the detector unit, and to output an electrical signal corresponding to the intensity of the light;
the cover plate further comprises a light entry surface which connects the light exit surface and the touch surface, and the light source is opposite to the light entry surface of the cover plate;
a refractive index of the cover plate is greater than a refractive index of air and less than a refractive index of a fingerprint.

16. The recognition device according to claim 15, wherein a distance between the touch surface of the cover plate and a surface, facing the cover plate, of the light barrier is greater than a distance between a plane where light irradiation surfaces of the plurality of detector units are located and a surface, facing the detection substrate, of the light barrier.

17. The recognition device according to claim 15, wherein the detection substrate is further provided with a temperature detector unit, and the temperature detector unit is configured to output a corresponding electrical signal according to a temperature of a region where the temperature detector unit is located.

* * * * *